US009230785B2

(12) United States Patent
Murase

(10) Patent No.: US 9,230,785 B2
(45) Date of Patent: Jan. 5, 2016

(54) ION TRAP MASS SPECTROMETER AND ION TRAP MASS SPECTROMETRY METHOD

(71) Applicant: SHIMADZU CORPORATION, Kyoto-shi, Kyoto (JP)

(72) Inventor: Masaki Murase, Nagoya (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 14/610,355

(22) Filed: Jan. 30, 2015

(65) Prior Publication Data

US 2015/0235830 A1 Aug. 20, 2015

(30) Foreign Application Priority Data

Feb. 19, 2014 (JP) ................................ 2014-029902

(51) Int. Cl.

| | |
|---|---|
| ***H01J 49/40*** | (2006.01) |
| ***G01N 27/62*** | (2006.01) |
| ***H01J 49/00*** | (2006.01) |
| ***H01J 49/16*** | (2006.01) |

(52) U.S. Cl.
CPC ........... *H01J 49/0045* (2013.01); *H01J 49/164* (2013.01); *H01J 49/40* (2013.01)

(58) Field of Classification Search
CPC . H01J 49/004; H01J 49/0036; H01J 49/0031; H01J 49/0027; H01J 49/02; H01J 49/0481; H01J 49/26; H01J 49/4265; G06F 19/703; G06F 19/22; G01N 27/62; G01N 30/72
USPC ................. 250/281, 282, 288, 283, 284, 299; 702/27, 23, 22, 30, 189, 32
See application file for complete search history.

(56) References Cited

U.S. PATENT DOCUMENTS

| | | | | |
|---|---|---|---|---|
| 6,914,239 | B2 * | 7/2005 | Yoshinari et al. | 250/281 |
| 6,917,037 | B2 * | 7/2005 | Ootake et al. | 250/282 |
| 6,967,323 | B2 * | 11/2005 | Hashimoto et al. | 250/281 |
| 7,473,892 | B2 * | 1/2009 | Sano et al. | 250/281 |
| 7,544,930 | B2 * | 6/2009 | Yoshinari et al. | 250/282 |
| 7,763,846 | B2 * | 7/2010 | Yamaguchi et al. | 250/281 |
| 7,880,135 | B2 * | 2/2011 | Umemura | 250/281 |
| 7,932,486 | B2 * | 4/2011 | Sano et al. | 250/281 |
| 7,956,320 | B2 * | 6/2011 | Yamaguchi | 250/281 |
| 7,998,750 | B2 * | 8/2011 | May et al. | 436/173 |
| 8,026,476 | B2 * | 9/2011 | Yamaguchi | 250/282 |
| 8,137,982 | B2 * | 3/2012 | May et al. | 436/173 |

(Continued)

OTHER PUBLICATIONS

Andrew N. Krutchinsky, et al., "Automatic Identification of Proteins with a MALDI-Quadrupole Ion Trap Mass Spectrometer", Anal. Chem., Nov. 1, 2001, pp. 5066-5077, vol. 73, No. 21.

(Continued)

*Primary Examiner* — David A Vanore
(74) *Attorney, Agent, or Firm* — Sughrue Mion, PLLC

(57) ABSTRACT

There are provided an ion trap mass spectrometer and an ion trap mass spectrometry method which can realize reduction of the number of times that a sample is ionized, and shortening of the measurement time. Ions corresponding to a plurality of peaks P11, P12 and P13 with the intensity or S/N ratio falling within a predetermined range L are detected as $MS^2$ precursor ions based on the $MS^1$ spectrum. A plurality of ions detected as the $MS^2$ precursor ions are dissociated at a time in an ion trap and subjected to mass spectrometry to measure a $MS^2$ spectrum.

10 Claims, 10 Drawing Sheets

(56) References Cited

U.S. PATENT DOCUMENTS

| | | | | |
|---|---|---|---|---|
| 8,180,576 | B2 * | 5/2012 | Yamaguchi | 702/22 |
| 8,417,466 | B2 * | 4/2013 | Yamaguchi | 702/23 |
| 8,455,818 | B2 * | 6/2013 | Coon et al. | 250/290 |
| 8,884,218 | B2 * | 11/2014 | Yamaguchi | 250/282 |
| 8,975,575 | B2 * | 3/2015 | Sekiya et al. | 250/282 |
| 2004/0169138 | A1 * | 9/2004 | Ootake et al. | 250/281 |
| 2008/0067344 | A1 * | 3/2008 | Yamaguchi et al. | 250/282 |
| 2008/0121793 | A1 * | 5/2008 | Yamaguchi et al. | 250/282 |
| 2008/0315081 | A1 * | 12/2008 | May et al. | 250/282 |
| 2011/0303842 | A1 * | 12/2011 | Nakano | 250/288 |
| 2013/0103322 | A1 * | 4/2013 | Morimoto | 702/20 |
| 2013/0116934 | A1 * | 5/2013 | Yamada | 702/28 |
| 2013/0253848 | A1 * | 9/2013 | Yamada | 702/23 |
| 2014/0249765 | A1 * | 9/2014 | Morimoto | 702/27 |
| 2014/0249766 | A1 * | 9/2014 | Kozawa et al. | 702/28 |
| 2014/0339422 | A1 * | 11/2014 | Niwa | 250/287 |

OTHER PUBLICATIONS

Anna Eriksson, et al., "Mesoporous $TiO_2$-Based Experimental Layout for On-Target Enrichment and Separation of Multi- and Monophosphorylated Peptides Prior to Analysis with Matrix-Assisted Laser Desorption-Ionization Mass Spectrometry", Analytical Chemistry, 2011, pp. 761-766, vol. 83.

* cited by examiner

ION TRAP MASS SPECTROMETER AND ION TRAP MASS SPECTROMETRY METHOD

BACKGROUND OF THE INVENTION

1. Field of the Invention

The present invention relates to an ion trap mass spectrometer and an ion trap mass spectrometry method in which ions obtained by ionizing a sample are captured in an ion trap, and the ions are dissociated and subjected to mass spectrometry to perform $MS^n$ analysis (n is an integer of 2 or greater).

2. Description of the Related Art

An ion trap mass spectrometer provided with an ion trap is widely used in identification of a high-molecular compound such as a peptide from a mixture sample such as a biological sample (see, for example, Andrew N. Krutchinsky, Markus Kalkum, and Brian T. Chait, Automatic Identification of Proteins with a MALDI-Quadrupole Ion Trap Mass Spectrometer, Anal. Chem., 2001, 73(21), 5066-5077). In this type of mass spectrometer, for example, a sample is vaporized in vacuum together with a matrix by MALDI (matrix-assisted laser desorption-ionization), and the sample is ionized by delivery of protons between the sample and the matrix. Ions obtained by ionizing the sample can be then captured in an ion trap and subjected to mass spectrometry.

FIG. 9 is a flow chart showing one example of process when mass spectrometry is performed by a conventional ion trap mass spectrometer. In this example, ions captured in an ion trap are dissociated by so called CID (collision-induced dissociation) and subjected to mass spectrometry to perform $MS^n$ analysis.

First, mass spectrometry ($MS^1$ analysis) of an ionized sample is performed to measure a $MS^1$ spectrum (step S501). The $MS^1$ spectrum is then analyzed to detect an ion corresponding to a peak that satisfies a predetermined criterion as a $MS^2$ precursor ion (steps S502 and S503).

When the $MS^2$ precursor ion is detected (Yes in step S504), ions obtained by ionizing the sample are captured in an ion trap, ions detected as $MS^2$ precursor ions are left in the ion trap and dissociated one by one, and subjected to mass spectrometry ($MS^2$ analysis) to measure a $MS^2$ spectrum (step S505). Thereafter, the $MS^2$ spectrum is analyzed to detect an ion corresponding to a peak that satisfies a predetermined criterion as a $MS^3$ precursor ion (steps S506 and S503).

In this manner, $MS^n$ analysis is performed by repeating the processes in steps S503 to S506 until the $MS^n$ precursor ion (n is an integer of 2 or greater) is no longer detected (No in step S504). Sample components can be identified based on the $MS^n$ spectrum obtained by the $MS^n$ analysis.

In the conventional ion trap mass spectrometer described above, one $MS^2$ precursor ion is usually selected from each peak and $MS^2$ analysis is performed when the $MS^1$ spectrum has a plurality of peaks that satisfy a predetermined criterion. That is, an attempt has not been made to identify a plurality of peptides by performing measurement for a plurality of $MS^2$ precursor ions in parallel.

Therefore, every time $MS^2$ analysis is performed for a $MS^2$ precursor ion corresponding to each peak in a $MS^1$ spectrum, a sample is ionized to reduce the amount thereof, so that the sample may be exhausted before all the components are identified. The measurement time is increased, so that a matrix may be sublimed in vacuum, thus making it impossible to continue measurement. Particularly, DHB (2,5-dihydroxybenzoic acid), a typical compound of a matrix is easily sublimed in vacuum.

The present invention has been devised in view of the above-described situations, and an object of the present invention is to provide an ion trap mass spectrometer and an ion trap mass spectrometry method which can realize reduction of the number of times that a sample is ionized, and shortening of the measurement time.

SUMMARY OF THE INVENTION

An ion trap mass spectrometer of the present invention is an ion trap mass spectrometer in which ions obtained by ionizing a sample are captured in an ion trap, and the ions are dissociated and subjected to mass spectrometry to perform $MS^n$ analysis (n is an integer of 2 or greater), the ion trap mass spectrometer including a $MS^1$ measurement processing section, a precursor ion detection processing section and a $MS^2$ measurement processing section. The $MS^1$ measurement processing section is configured to measure a $MS^1$ spectrum by performing mass spectrometry of the ionized sample. The precursor ion detection processing section is configured to detect, as $MS^2$ precursor ions, ions corresponding to a plurality of peaks with the intensity or S/N ratio falling within a predetermined range, based on the $MS^1$ spectrum. The $MS^2$ measurement processing section is configured to measure a $MS^2$ spectrum by dissociation of a plurality of ions, which are detected as $MS^2$ precursor ions, at a time in the ion trap and subjecting the ions to mass spectrometry.

According to this configuration, ions corresponding to a plurality of peaks with the intensity or S/N ratio falling within a predetermined range are detected as $MS^2$ precursor ions based on a $MS^1$ spectrum, and the plurality of ions are dissociated at a time in an ion trap and subjected to mass spectrometry, whereby a $MS^2$ spectrum can be measured. When based on the $MS^2$ spectrum thus obtained, components corresponding to a plurality of peaks are identified at a time, the number of measurements is reduced, so that the number of times that a sample is ionized can be reduced, and the measurement time can be shortened.

The ion trap mass spectrometer may further include a $MS^3$ measurement processing section. In this case, the $MS^3$ measurement processing section may be configured to measure a $MS^3$ spectrum in the following manner: among product ions produced through the dissociation treatment in measurement of the $MS^2$ spectrum, only an ion corresponding to a peak at a predetermined mass-to-charge ratio is dissociated and subjected to mass spectrometry.

In the ion trap mass spectrometer, when a fragment ion generated due to a neutral loss by a releasable modified molecule and an adducts exist in the $MS^1$ spectrum, $MS^2$ analysis can be performed while one of ion peaks adjacent with a mass difference in mass-to-charge ratio of an ion corresponding to a known neutral loss is left and the rest is excluded from precursor ions to be subjected to $MS^2$ analysis. A situation can be hereby prevented in which a plurality of peptide-derived product ions sharing a partial structure are superimposed due to a neutral loss, so that it becomes difficult to analyze a structure of a part that is not shared.

The ion trap mass spectrometer may further include a $MS^2$ remeasurement processing section. In this case, the $MS^2$ remeasurement processing section may be configured to perform a process by the $MS^2$ measurement processing section again for an ion corresponding to a component that cannot be identified when a component that cannot be identified exists in a plurality of ions detected as the $MS^2$ precursor ions.

According to this configuration, even when a component that cannot be identified exists in a plurality of ions detected as $MS^2$ precursor ions due to a difference in product ion production efficiency between components, etc., a $MS^2$ spectrum can be measured again for an ion corresponding to the component that cannot be identified. When identification is performed again based on the $MS^2$ spectrum thus obtained, measurement can be performed while a difference in product ion production efficiency between components is taken into consideration.

The ion trap mass spectrometer may further include an on-target separation processing section and a $MS^1$ remeasurement processing section. In this case, the on-target separation processing section may be configured to perform a process in which a sample on a target is separated on the target when a component that cannot be identified exists in a plurality of ions detected as the $MS^2$ precursor ions. Further, the $MS^1$ remeasurement processing section may be configured to perform a process by the $MS^1$ measurement processing section again for the sample treated by the on-target separation processing section.

According to this configuration, even when a component that cannot be identified exists in a plurality of ions detected as $MS^2$ precursor ions, the component may be capable of being identified by performing a process by the $MS^1$ measurement processing section again for the sample treated by the on-target separation processing section. Further, a component that does not appear as a peak in the $MS^1$ spectrum before the sample is treated by the on-target separation processing section may appear as a peak when the sample is treated by the on-target separation processing section. Therefore, by performing a process by the $MS^1$ measurement processing section again for the sample treated by the on-target separation processing section, a larger number of components can be identified.

An ion trap mass spectrometry method of the present invention is an ion trap mass spectrometry method in which ions obtained by ionizing a sample are captured in an ion trap, and the ions are dissociated and subjected to mass spectrometry to perform $MS^n$ analysis (n is an integer of 2 or greater), the method including a $MS^1$ measurement step, a precursor ion detection step and a $MS^2$ measurement step. The $MS^1$ measurement step is a step of measuring a $MS^1$ spectrum by performing mass spectrometry of the ionized sample. The precursor ion detection step is a step of detecting, as $MS^2$ precursor ions, ions corresponding to a plurality of peaks with the intensity or S/N ratio falling within a predetermined range, based on the $MS^1$ spectrum. The $MS^2$ measurement step is a step of measuring a $MS^2$ spectrum by dissociation of a plurality of ions, which are detected as $MS^2$ precursor ions, in the ion trap and subjecting the ions to mass spectrometry.

According to the present invention, components corresponding to a plurality of peaks with the intensity or S/N ratio falling within a predetermined range can be identified at a time, and therefore the number of measurements is reduced, so that the number of times that a sample is ionized can be reduced, and the measurement time can be shortened.

DETAILED DESCRIPTION OF THE PREFERRED EMBODIMENTS

Figure 1:
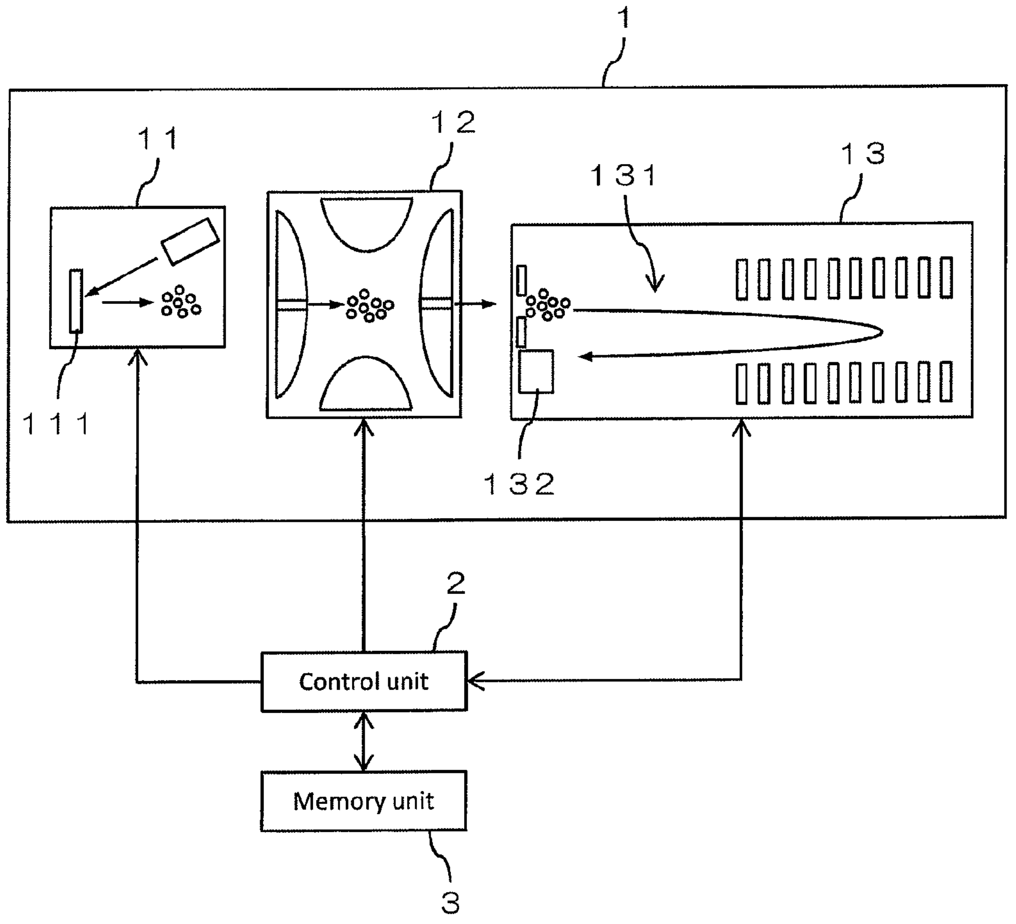
FIG. 1 is a schematic view showing an example of a configuration of an ion trap mass spectrometer according to one embodiment of the present invention.

FIG. 1 is a schematic view showing an example of a configuration of an ion trap mass spectrometer according to one embodiment of the present invention. The ion trap mass spectrometer (hereinafter, referred to simply as a "mass spectrometer") according to this embodiment can be used in identification of a high-molecular compound such as a peptide from a mixture sample such as a biological samples, and includes a mass spectrometry unit 1, a control unit 2, a memory unit 3, and so on.

The mass spectrometry unit 1 includes, for example, an ionization unit 11, an ion trap 12 and a TOFMS (time of flight mass spectrometer) 13. In this embodiment, a matrix-assisted laser desorption-ionization ion trap time of flight mass spectrometer (MALDI-IT-TOFMS) is described as one example of the mass spectrometer.

The ionization unit 11 ionizes a sample, and supplies the obtained ions to the ion trap 12. In this example, by irradiating the sample with a laser beam using MALDI (matrix-assisted laser desorption-ionization), a sample is vaporized in vacuum together with a matrix, and the sample is ionized by delivery of protons between the sample and the matrix. The sample is provided in a concentrated state, for example, on a target 111 formed of a plate, and set in the ionization unit 11 in a vacuum state together with the target 111 at the time of analysis.

The ion trap 12 is, for example, of a three-dimensional quadrupole type, and can capture ions obtained in the ionization unit 11, and selectively leave some of the captured ions in the ion trap 12 and dissociate the ions by CID (collision-induced dissociation). The ions dissociated in this manner are supplied to the TOFMS 13 from the ion trap 12.

In the TOFMS 13, ions flying in a flight space 131 are detected by an ion detector 132. Specifically, ions accelerated by an electric field formed in the flight space 131 are temporally separated according to a mass-to-charge ratio while flying in the flight space 131, and sequentially detected by the ion detector 132. A relationship between a mass-to-charge ratio and a detection intensity in the ion detector 132 is hereby measured as a spectrum to realize mass spectrometry.

In this embodiment, by repeatedly performing a series of operations in which ions are dissociated in the ion trap 12 and subjected to mass spectrometry by the TOFMS 13, $MS^n$ analysis (n is an integer of 2 or greater) can be performed to measure a $MS^n$ spectrum. Sample components can be identified by performing database search using $MS^n$ spectra obtained as described above.

The control unit 2 controls the operations of the mass spectrometry unit 1, and processes a $MS^n$ spectrum obtained by mass spectrometry. The memory unit 3 includes, for example, a RAM (Random Access Memory), a ROM (Read Only Memory), a hard disk and so on, and stores data used for process in the control unit 2, data generated by process in the control unit 2, and so on. The control unit 2 and the memory unit 3 may be formed integrally with or separately from the mass spectrometry unit 1.

Figure 2:
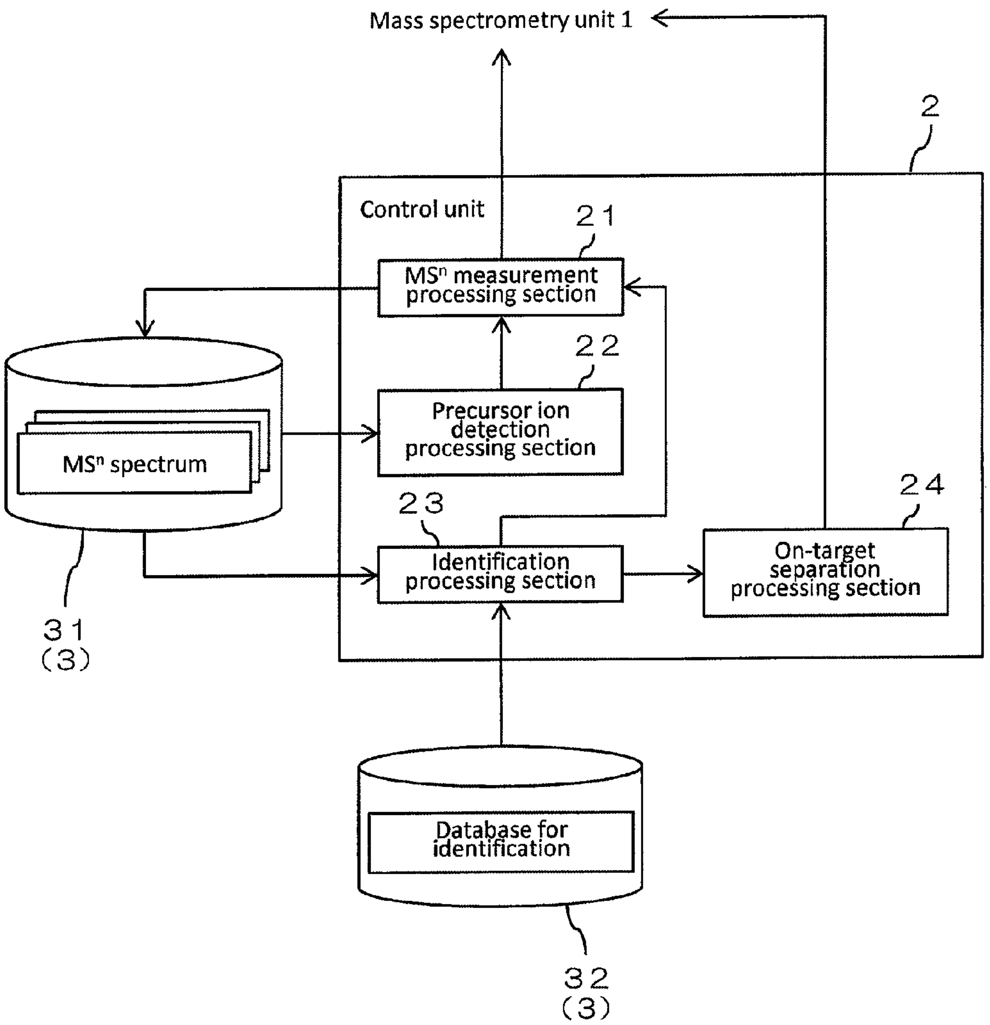
FIG. 2 is a block diagram showing one example of a control unit and a memory unit.

FIG. 2 is a block diagram showing one example of the control unit 2 and the memory unit 3. For example, the control unit 2 includes a CPU (Central processing Unit), and functions as a $MS^n$ measurement processing section 21, a precursor ion detection processing section 22, an identification processing section 23, an on-target separation processing section 24 and so on, as the CPU runs a program.

The $MS^n$ measurement processing section 21 performs a process for measuring a $MS^n$ spectrum in the mass spectrometry unit 1. The measured $MS^n$ spectrum is stored in a spectrum storage region 31 assigned to the memory unit 3. In the $MS^n$ analysis, a $MS^1$ spectrum, a $MS^2$ spectrum, a $MS^3$ spectrum . . . are sequentially measured, and each is stored in the spectrum storage region 31.

The precursor ion detection processing section 22 detects, based on a $MS^{n-1}$ spectrum, an ion ($MS^n$ precursor ion) that is a target at the time of measuring a $MS^n$ spectrum. In $MS^n$ analysis, mass spectrometry ($MS^1$ analysis) of a sample ionized in the ionization unit 11 is first performed in the TOFMS 13 to measure a $MS^1$ spectrum. At this time, the $MS^n$ measurement processing section 21 functions as a $MS^1$ measurement processing section. The precursor ion detection processing section 22 then detects a $MS^2$ precursor ion based on the measured $MS^1$ spectrum.

Thereafter, $MS^2$ analysis is performed for the $MS^2$ precursor ion. Specifically, ions obtained by ionizing a sample in the ionization unit 11 are captured in the ion trap 12, and only an ion detected as a $MS^2$ precursor ion is separated in the ion trap 12. The ion left in the ion trap 12 is dissociated by CID, and subjected to mass spectrometry ($MS^2$ analysis) in the TOFMS 13 to measure a $MS^2$ spectrum. At this time, the $MS^n$ measurement processing section 21 functions as a $MS^2$ measurement processing section.

The identification processing section 23 performs a process for identifying a sample component based on the measured $MS^n$ spectrum. In this example, a database for identification is assigned to a database region 32 that is a part of the memory unit 3. Sample components can be identified by calculating a degree of coincidence between data of the mass-to-charge ratio for various sample components, which is included in the database for identification, and the mass-to-charge ratio of each peak included in the $MS^n$ spectrum. The identification process may be configured to be automatically performed, or may be configured to be manually performed by a user.

For example, in identification of sample components after $MS^2$ analysis, database search is performed using a database for identification based on the mass-to-charge ratio of a peak corresponding to the $MS^2$ precursor ion in the $MS^1$ spectrum and the mass-to-charge ratio of each peak in the $MS^2$ spectrum. As a result, when a component that cannot be identified exists, the $MS^n$ measurement processing section 21 performs a process for measuring a $MS^3$ spectrum. It is to be noted that the database for identification is not necessarily configured to be assigned to the memory unit 3 of the mass spectrometer, and for example, a database connected to the mass spectrometer through a network can be used.

An on-target separation processing section 24 performs a process in which a sample concentrated on the target 111 is separated on the target 111 (on-target separation) for the mass spectrometry unit 1. In on-target separation, for example, a phosphorylated peptide on the target 111 can be flushed with a phosphate solution and separated using a known method (see, for example, Analytical Chemistry, 2011, No. 83, pages 761-766). In this embodiment, on-target separation can be performed when a component that cannot be identified in the identification processing section 23 exists.

Figure 3:
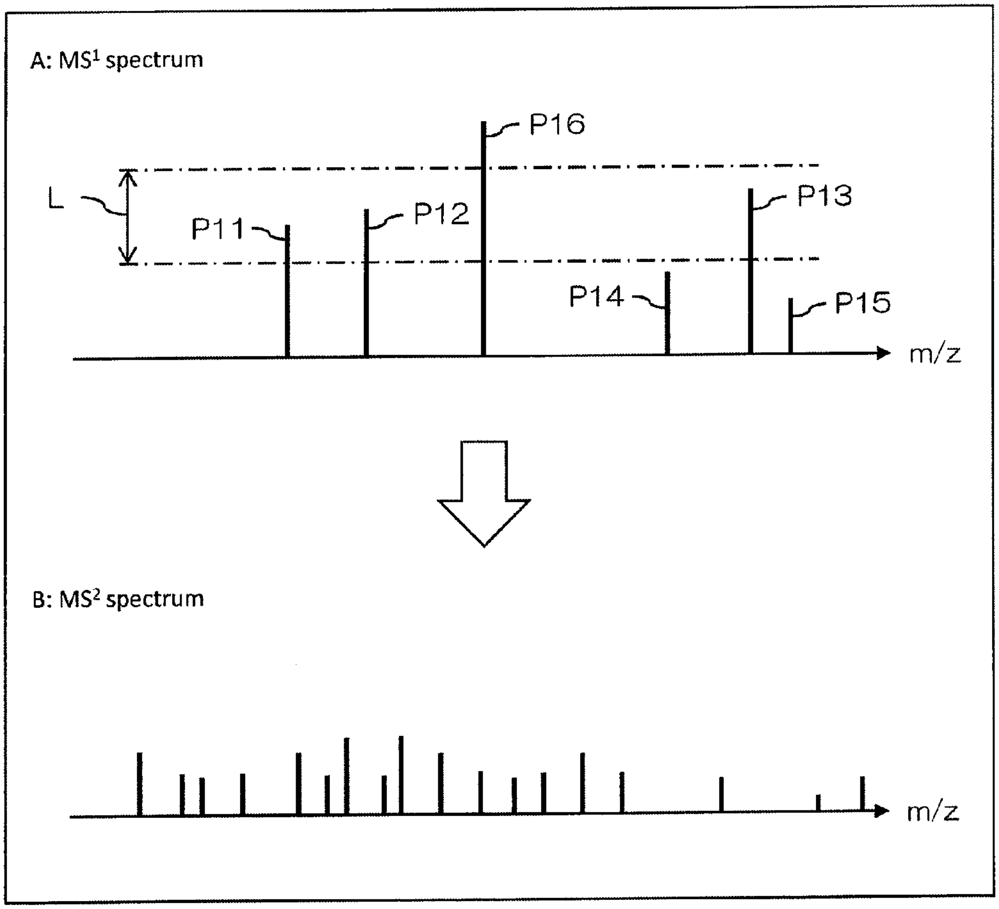
FIG. 3 is a schematic view showing one example of a $MS^1$ spectrum and $MS^2$ spectrum.

FIG. 3 is a schematic view showing one example of a $MS^1$ spectrum and $MS^2$ spectrum. Here, FIG. 3A is a schematic view of a $MS^1$ spectrum obtained by subjecting a sample to $MS^1$ analysis. FIG. 3B is a schematic view of a $MS^2$ spectrum obtained by performing $MS^2$ analysis for a $MS^2$ precursor ion detected based on the $MS^1$ spectrum in FIG. 3A.

In this embodiment, ions corresponding to a plurality of peaks are detected at the time of detecting a $MS^2$ precursor ion based on the $MS^1$ spectrum. In the example in FIG. 3A, ions corresponding to a plurality of peaks P11, P12 and P13 with the intensity or S/N ratio falling within a predetermined range L in the $MS^1$ spectrum are detected as $MS^2$ precursor ions. The predetermined range L may be predefined, or may be arbitrarily settable.

The predetermined range L is a range defined by a lower limit value and an upper limit value. Therefore, ions corresponding to peaks with the intensity or S/N ratio being below the lower limit value (P14 and P15) and above the upper limit value (P16) are not detected as $MS^2$ precursor ions. In this way, only ions corresponding to a plurality of peaks P11, P12 and P13, which are relatively close in intensity or S/N ratio, can be detected as $MS^2$ precursor ions.

In $MS^2$ analysis, ions obtained by ionizing a sample in the ionization unit 11 are captured in the ion trap 12, and a plurality of ions detected as $MS^2$ precursor ions are then separated in the ion trap 12. The plurality of ions left in the ion trap 12 are dissociated at a time by CID, and $MS^2$ analysis is performed to obtain a $MS^2$ spectrum as shown in FIG. 3B.

Figure 4:
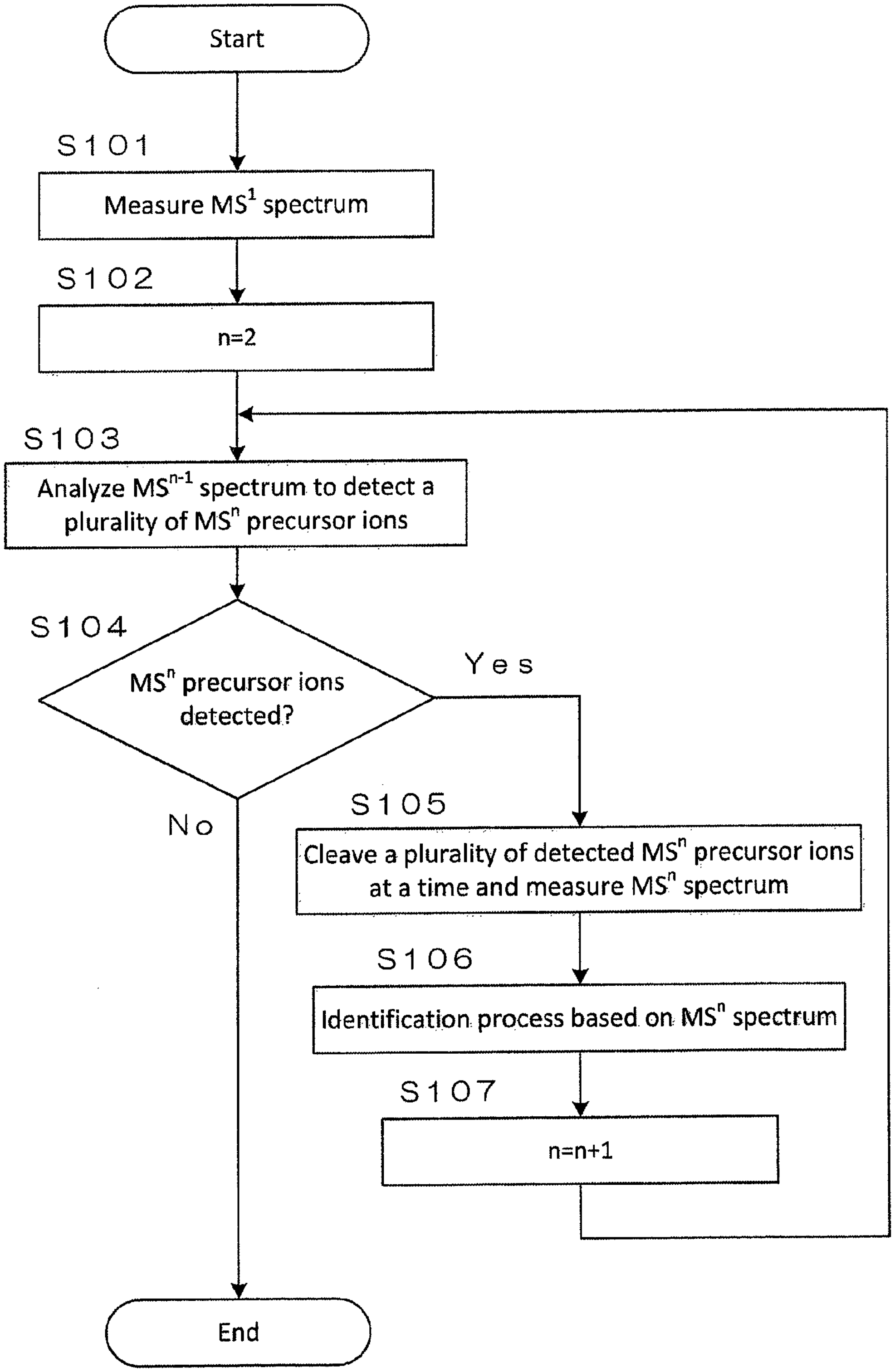
FIG. 4 is a flow chart showing one example of process by the control unit at the time of performing $MS^n$ analysis.

FIG. 4 is a flow chart showing one example of process by the control unit 2 at the time of performing $MS^n$ analysis. For performing $MS^n$ analysis, mass spectrometry ($MS^1$ analysis) of an ionized sample is first performed to measure a $MS^1$ spectrum (step S101: $MS^1$ measurement step). The $MS^1$ spectrum is then analyzed to detect, as $MS^2$ precursor ions, ions corresponding to a plurality of peaks with the intensity or S/N ratio falling within a predetermined range (steps S102 and S103: precursor ion detection steps).

When the $MS^2$ precursor ions are detected (Yes in step S104), ions obtained by ionizing the sample are captured in the ion trap 12, the plurality of ions detected as $MS^2$ precursor ions are left in the ion trap 12 and dissociated at a time, and subjected to mass spectrometry ($MS^2$ analysis) to measure a $MS^2$ spectrum (step S105: $MS^2$ measurement step). An identification process is performed based on the measured $MS^2$ spectrum to identify sample components (step S106: identification step).

Thereafter, the $MS^2$ spectrum is analyzed to detect, as $MS^3$ precursor ions, ions corresponding to a plurality of peaks with the intensity or S/N ratio falling within a predetermined range (steps S107 and S103: precursor ion detection steps). At this time, the range of the intensity or S/N ratio of peaks corresponding to ions detected as $MS^3$ precursor ions may be identical to or different from the range of the intensity or S/N ratio of peaks corresponding to ions detected as $MS^2$ precursor ions.

In this manner, $MS^n$ analysis is performed by repeating the processes in steps S103 to S107 until the $MS^1$ precursor ion is no longer detected (No in step S104).

As described above, in this embodiment, ions corresponding to a plurality of peaks with the intensity or S/N ratio falling within a predetermined range L are detected as $MS^2$ precursor ions based on the $MS^1$ spectrum, and the plurality of ions are dissociated at a time in the ion trap 12 and subjected to mass spectrometry, whereby a $MS^2$ spectrum can be measured. When based on the $MS^2$ spectrum thus obtained, components corresponding to a plurality of peaks are identified at a time, the number of measurements is reduced, so that the number of times that a sample is ionized can be reduced, and the measurement time can be shortened.

In the embodiment described above, a configuration has been described in which ions corresponding to a plurality of peaks are detected as $MS^2$ precursor ions based only on the condition of whether or not the intensity or S/N ratio falls within the predetermined range L, but the present invention is not limited to this configuration, and other conditions may be included. For example, a configuration may be employed in which ions corresponding to a plurality of peaks with the intensity or S/N ratio falling within the predetermined range L among a plurality of peaks with the mass-to-charge ratio falling within a predetermined range are detected as $MS^2$ precursor ions. In this case, a configuration may be employed in which by setting a plurality of ranges of the mass-charge ratio and performing measurement for each range, measurement is performed with a measurable range of the mass-to-charge ratio divided into a plurality of sections.

Figure 5:
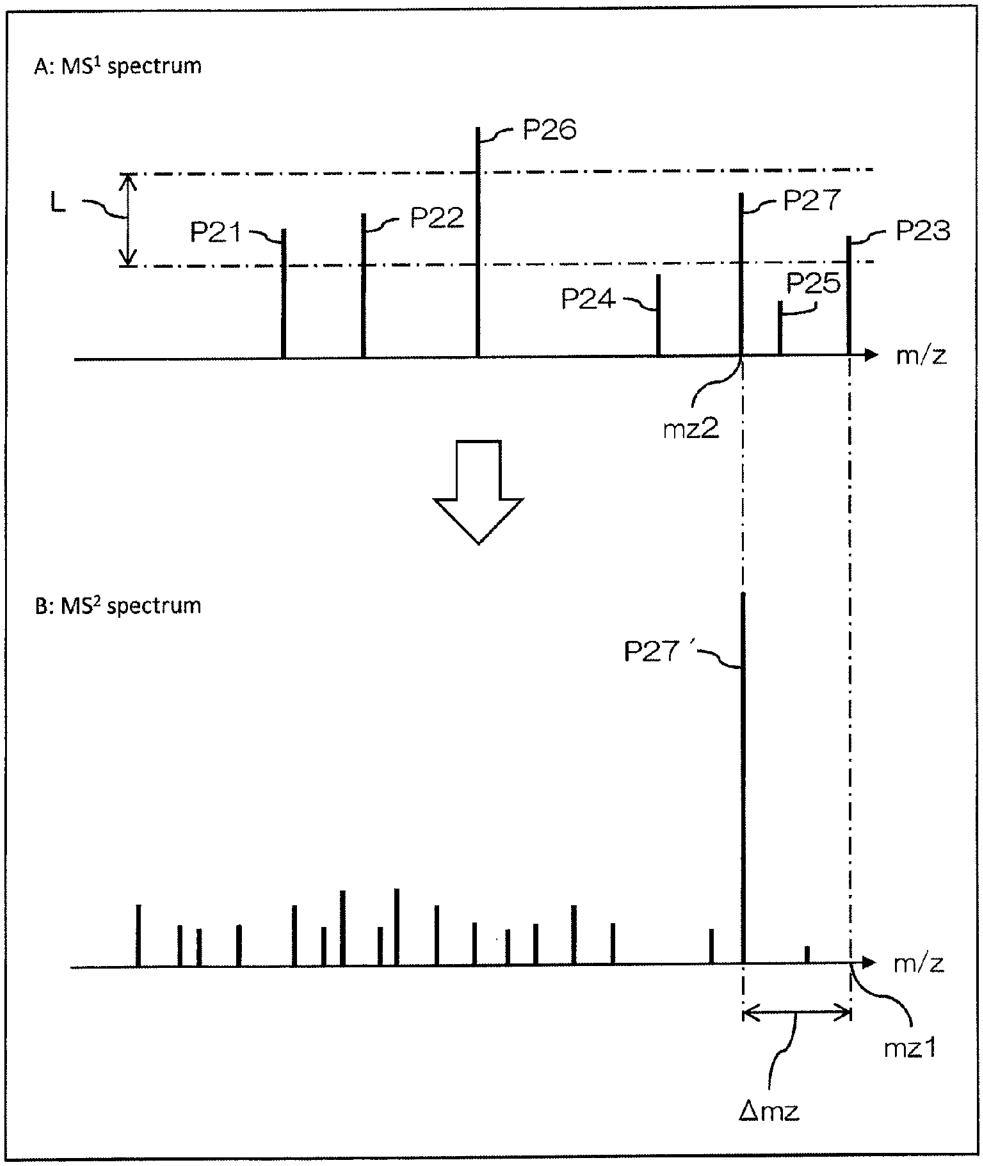
FIG. 5 is a schematic view showing one example of a $MS^1$ spectrum and $MS^2$ spectrum when an ion that is easily released to a $MS^2$ precursor ion is included.

FIG. 5 is a schematic view showing one example of a $MS^1$ spectrum and $MS^2$ spectrum when an ion that is easily released to a $MS^2$ precursor ion is included. Here, FIG. 5A is a schematic view of a $MS^1$ spectrum obtained by subjecting a sample to $MS^1$ analysis. FIG. 5B is a schematic view of a $MS^2$ spectrum obtained by performing $MS^2$ analysis for a $MS^2$ precursor ion detected based on the $MS^1$ spectrum in FIG. 5A.

As in the case of FIG. 3, ions corresponding to a plurality of peaks are detected at the time of detecting a $MS^2$ precursor ion based on $MS^1$ spectrum. In the example in FIG. 5A, ions P21, P22 and P23, which are left after excluding one of ions P23 and P27 adjacent in terms of a mass difference at a predetermined mass-to-charge ratio Δmz (ion P27 in the lower mass range in this example), among ions corresponding to a plurality of peaks P21, P22, P23 and P27 with the intensity or S/N ratio falling within the predetermined range L in the $MS^1$ spectrum are detected as $MS^2$ precursor ions. On the other hand, ions corresponding to peaks P24, P25 and P26 with the intensity or S/N ratio falling out of the predetermined range L are not detected as $MS^2$ precursor ions.

In $MS^2$ analysis, ions obtained by ionizing a sample in the ionization unit 11 are captured in the ion trap 12, and a plurality of ions detected as $MS^2$ precursor ions are then separated in the ion trap 12. The plurality of ions left in the ion trap 12 are dissociated at a time by CID, and $MS^2$ analysis is performed to obtain a $MS^2$ spectrum as shown in FIG. 5B.

In this example, a plurality of ions detected as $MS^2$ precursor ions include ions that are easily released, and therefore a high-intensity peak 27' appears in the lower mass range at a predetermined mass-to-charge ratio Δmz with respect to the mass-to-charge ratio mz1 of the precursor ion P23 in product ions obtained by measuring the $MS^2$ spectrum.

In this embodiment, the $MS^n$ measurement processing section 21 dissociates only an ion corresponding to the peak P27' and subjects the ion to mass spectrometry ($MS^3$ analysis) to measure a $MS^3$ spectrum in the case where a peptide cannot be identified from the $MS^2$ spectrum when the peak P27' appears at a predetermined mass-to-charge ratio calculated from a known mass difference Δmz as described above. At this time, the $MS^n$ measurement processing section 21 functions as a $MS^3$ measurement processing section.

Figure 6A:
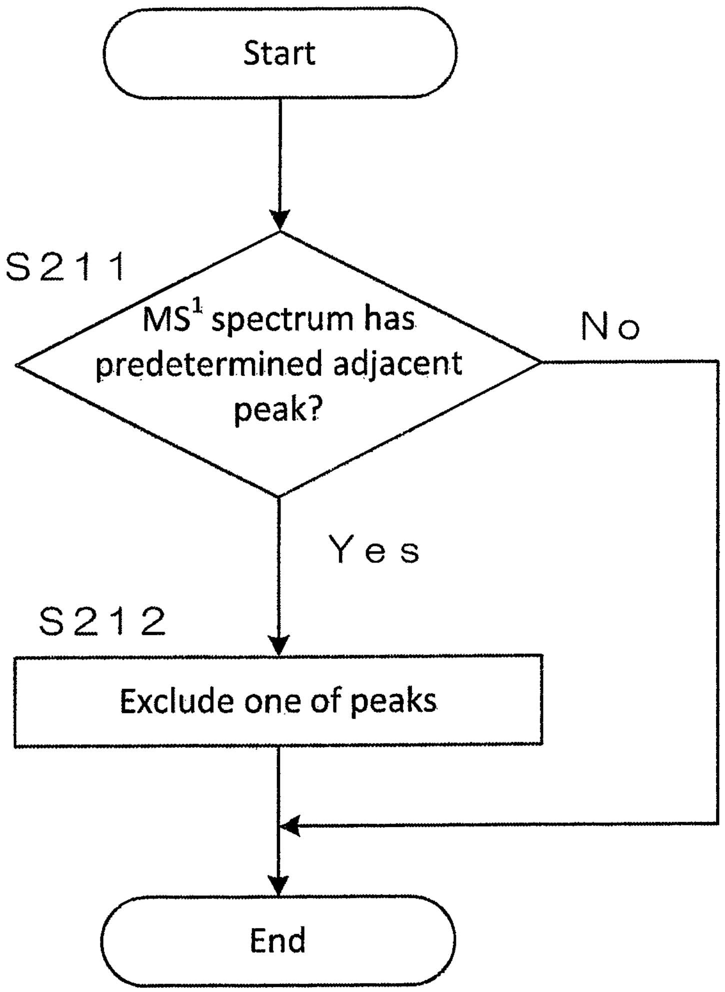
FIGS. 6A and 6B are flow charts each partially showing a first modification of a process by the control unit at the time of performing $MS^n$ analysis.
Figure 6B:
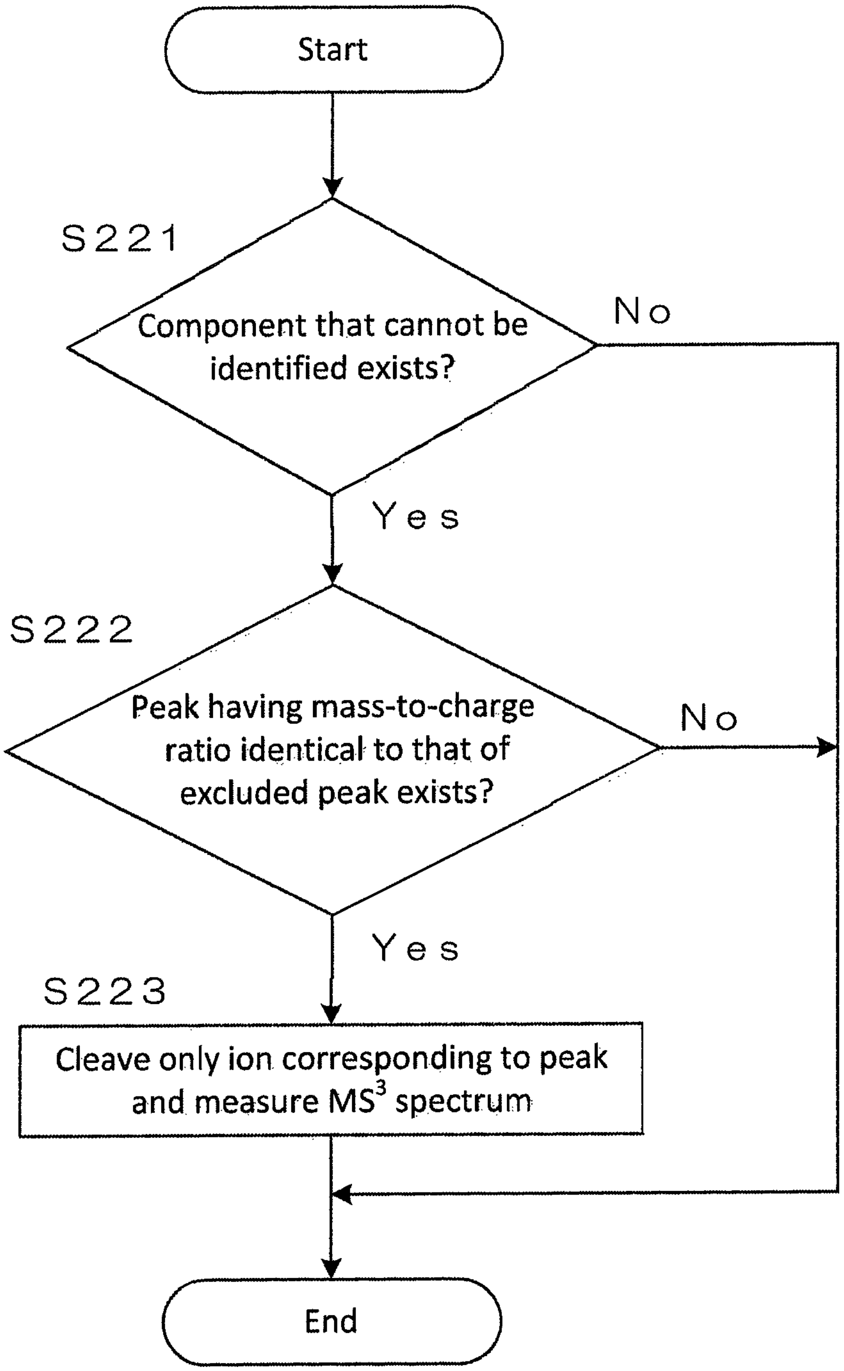

FIGS. 6A and 6B are flow charts each partially showing a first modification of a process by the control unit 2 at the time of performing $MS^n$ analysis. The process shown in FIG. 6A can be performed at the time of selecting a $MS^2$ precursor (step S103 in FIG. 4), and the process shown in FIG. 6B can be performed after the identification process based on the $MS^2$ spectrum at the time of $MS^2$ analysis (after step S106 in FIG. 4).

When peaks P23 and P27 adjacent with a mass difference in a predetermined mass-to-charge ratio Δmz (Yes in step S211) among a plurality of peaks P21, P22, P23 and P27 with the intensity or S/N ratio falling within the predetermined range L in the $MS^1$ spectrum at the time of selecting a $MS^2$ precursor ion, a $MS^2$ precursor ion left after excluding one of the adjacent peaks is selected (step S212) as shown in FIG. 6A. At this time, the peak P27 in the lower mass range may be excluded as in the example in FIG. 5.

When as a result of the identification process, a component that cannot be identified exists in a plurality of ions detected as $MS^2$ precursor ions (Yes in step S221), whether or not there is a peak P27' having a mass-to-charge ratio identical to that of the peak excluded in step S212 in FIG. 6A is determined (step S222) as shown in FIG. 6B. When as a result, the measured $MS^2$ spectrum has an ion peak P27' corresponding to the peak P27 excluded from $MS^2$ precursor candidates as a peak adjacent in terms of a predetermined mass difference Δmz at a mass-to-charge ratio of a known modified molecule (Yes in step S222), only an ion corresponding to the peak P27' is dissociated among ions in the ion trap 12, which are dissociated at the time of measuring the $MS^2$ spectrum. The dissociated ion is then subjected to mass spectrometry ($MS^3$ analysis) with respect to the dissociated ions to measure a $MS^3$ spectrum (step S203: $MS^3$ measurement step).

Thus, in the modification in FIG. 6, when a fragment ion generated due to a neutral loss by a releasable modified molecule and an adducts exist in the $MS^1$ spectrum, $MS^2$ analysis can be performed while one of ion peaks adjacent with a mass difference Δmz in mass-to-charge ratio of an ion corresponding to a known neutral loss is excluded from precursor ions to be subjected to $MS^2$ analysis. A situation can be hereby prevented in which a plurality of peptide-derived product ions sharing a partial structure are superimposed, so that it becomes difficult to analyze a structure of a part that is not shared.

Figure 7:
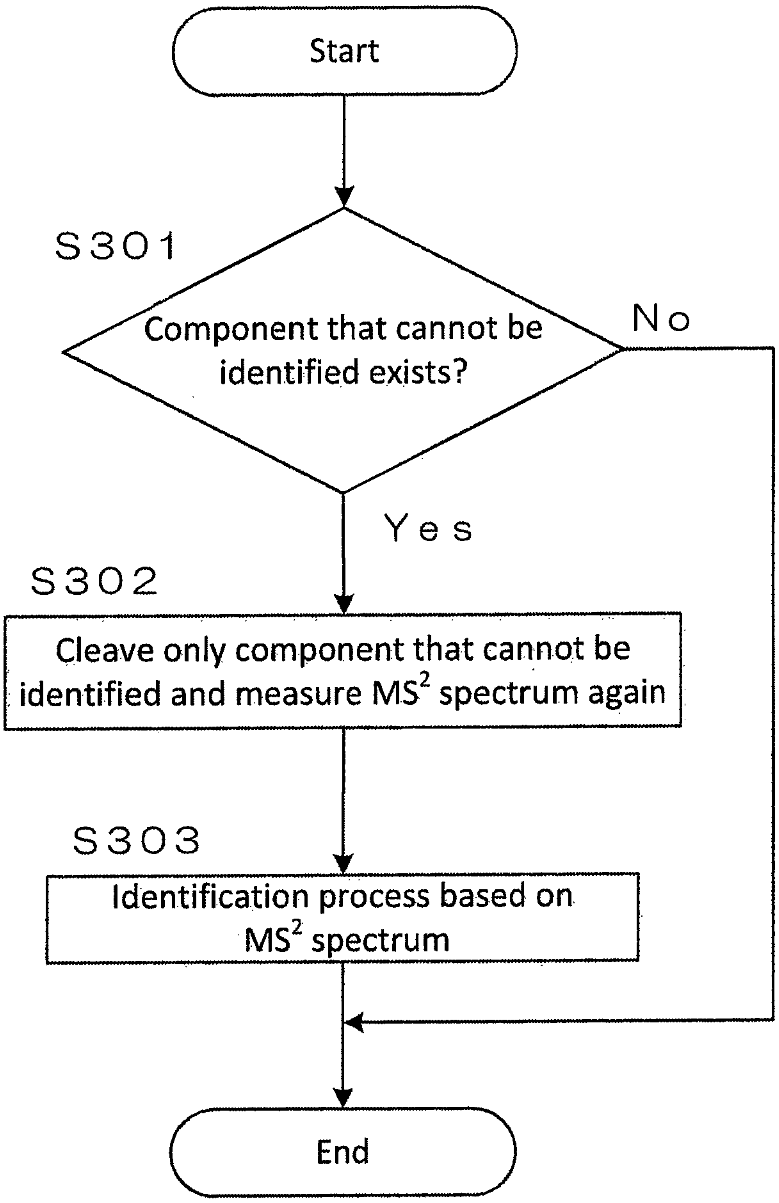
FIG. 7 is a flow chart partially showing a second modification of a process by the control unit at the time of performing $MS^n$ analysis.

FIG. 7 is a flow chart partially showing a second modification of a process by the control unit 2 at the time of performing $MS^n$ analysis. The process shown in FIG. 7 can be performed after the identification process based on the $MS^2$ spectrum at the time of $MS^2$ analysis (after step S106 in FIG. 4).

Specifically, when as a result of the identification process, a component that cannot be identified exists in a plurality of ions detected as $MS^2$ precursor ions (Yes in step S301), the $MS^n$ measurement processing section 21 performs $MS^2$ analysis again for an ion corresponding to the component that cannot be identified. That is, ions obtained by ionizing the sample are captured in the ion trap 12, and only an ion corresponding to the component that cannot be identified is left in the ion trap 12 and dissociated, and subjected to mass spectrometry to measure a $MS^2$ spectrum again (step S302: $MS^2$ remeasurement step). At this time, the $MS^n$ measurement processing section 21 functions as a $MS^2$ remeasurement processing section.

An identification process is performed based on the measured $MS^2$ spectrum to identify sample components (step S303: identification step). In the modification in FIG. 7, even when a component that cannot be identified exists in a plurality of ions detected as $MS^2$ precursor ions due to a difference in product ion production efficiency between components, etc., a $MS^2$ spectrum can be measured again for an ion corresponding to the component that cannot be identified. When identification is performed again based on the $MS^2$ spectrum thus obtained, measurement can be performed while a difference in product ion production efficiency between components is taken into consideration.

Remeasurement of the $MS^2$ spectrum may be performed under conditions identical to or different from those for the first measurement of the $MS^2$ spectrum. For example, when conditions such as the cumulated number of laser irradiation to a sample and a laser intensity are changed, a sample that is hardly ionized may be properly identified. The processes in steps S301 to S303 in FIG. 7 may be repeatedly performed multiple times.

Figure 8:
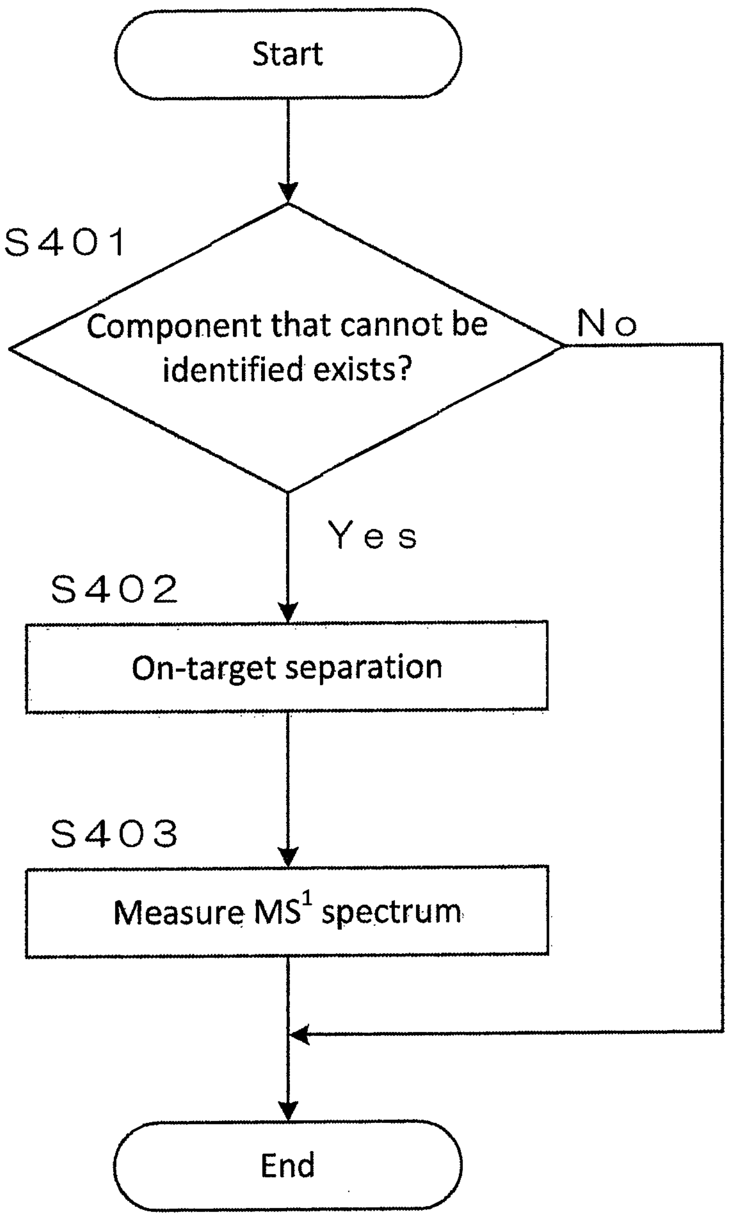
FIG. 8 is a flow chart partially showing a third modification of a process by the control unit at the time of performing $MS^n$ analysis.
Figure 9:
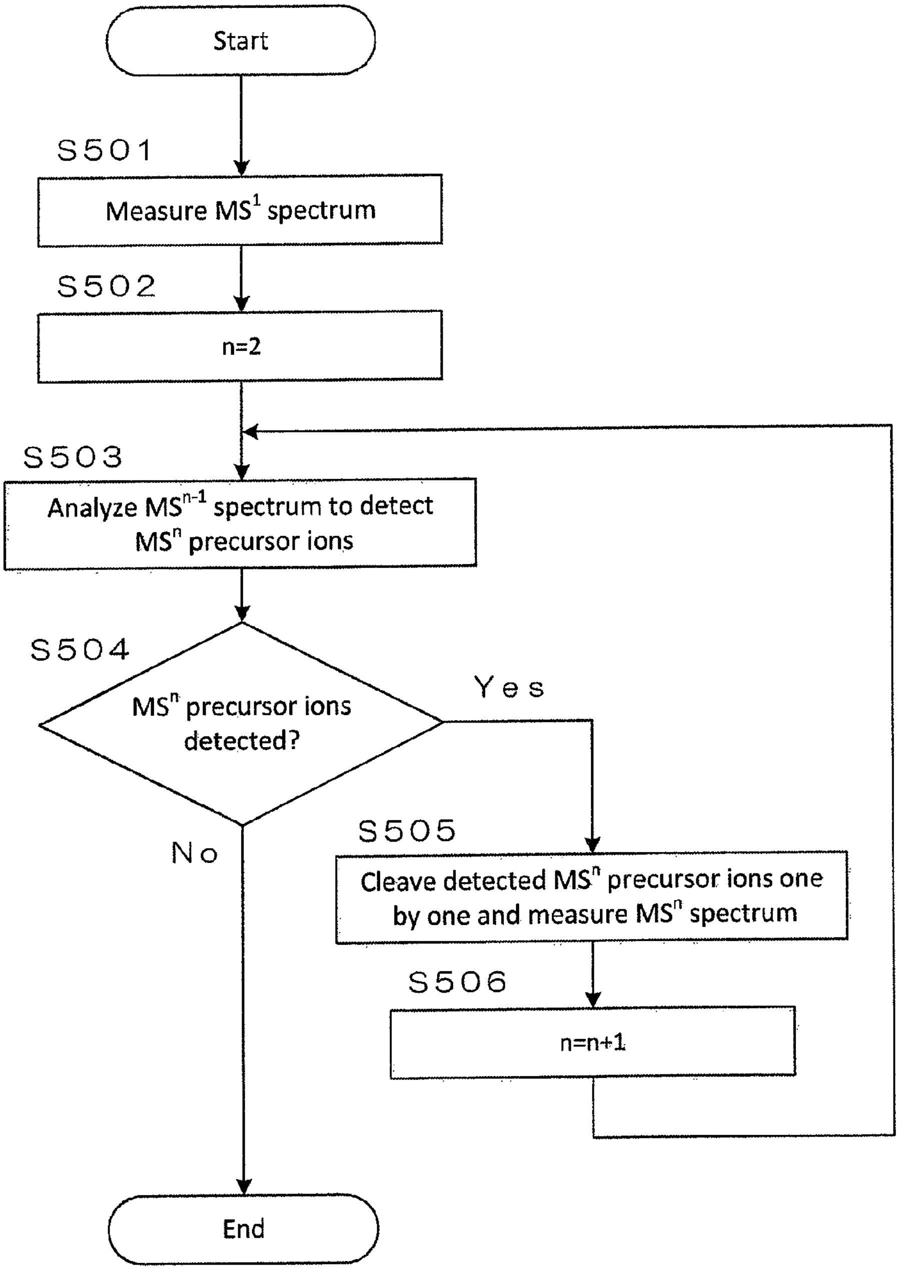
Fig.9 Prior Art
FIG. 9 is a flowchart showing one example of process when mass spectrometry is performed by a conventional ion trap mass spectrometer.

FIG. 8 is a flow chart partially showing a third modification of a process by the control unit 2 at the time of performing $MS^n$ analysis. The process shown in FIG. 8 can be performed after the identification process based on the $MS^2$ spectrum at the time of $MS^2$ analysis (after step S106 in FIG. 4).

Specifically, when as a result of the identification process, a component that cannot be identified exists in a plurality of ions detected as $MS^2$ precursor ions (Yes in step S401), the on-target separation processing section 24 performs a process for subjecting a sample concentrated on the target 111 to on-target separation (step S402: on-target separation step). For the sample subjected to on-target separation, the $MS^n$ measurement processing section 21 performs $MS^1$ analysis again to measure a $MS^1$ spectrum (step S403: $MS^1$ remeasurement step). At this time, the $MS^n$ measurement processing section 21 functions as a $MS^1$ remeasurement processing section.

In the modification in FIG. 8, even when a component that cannot be identified exists in a plurality of ions detected as $MS^2$ precursor ions, the component may be capable of being identified by performing $MS^1$ analysis again for the sample subjected to on-target separation. Further, a component that does not appear as a peak in the $MS^1$ spectrum before the sample is subjected to on-target separation may appear as a peak when the sample is subjected to on-target separation. Therefore, by performing $MS^1$ analysis again for the sample subjected to on-target separation, a larger number of components can be identified.

After the process in FIG. 8 is performed, a next process can be started at step S102 in FIG. 4. The processes in steps S401 to S403 in FIG. 8 may be repeatedly performed multiple times.

In the embodiment described above, the mass spectrometer is a MALDI-IT-TOFMS. However, the present invention is not limited to the above-mentioned configuration, and for example, a configuration may be employed in which the ionization unit 11 ionizes a sample using an ionization method using laser irradiation, other than MALDI.

The mass spectrometer is not limited to the TOFMS 13, and a configuration may be employed in which mass spectrometry is performed using other mass spectrometers such as a magnetic sector type mass spectrometer, a quadrupole mass spectrometer and a Fourier transform ion cyclotron resonance mass spectrometer, or a configuration may be employed in which mass spectrometry is performed using the mass separation function of the ion trap 12 itself.

What is claimed is:

1. An ion trap mass spectrometer in which ions obtained by ionizing a sample are captured in an ion trap, and the ions are dissociated and subjected to mass spectrometry to perform $MS^n$ analysis (n is an integer of 2 or greater), the ion trap mass spectrometer comprising:

a $MS^1$ measurement processing section configured to measure a $MS^1$ spectrum by performing mass spectrometry of the ionized sample;

a precursor ion detection processing section configured to detect, as $MS^2$ precursor ions, ions corresponding to a plurality of peaks with the intensity or S/N ratio falling within a predetermined range, based on the $MS^1$ spectrum; and a $MS^2$ measurement processing section configured to measure a $MS^2$ spectrum by dissociation of a plurality of ions, which are detected as $MS^2$ precursor ions, at a time in the ion trap and subjecting the ions to mass spectrometry.

2. The ion trap mass spectrometer according to claim 1, wherein the precursor ion detection processing section is configured to leave one of peaks adjacent with a predetermined mass-to-charge ratio as a mass difference among a plurality of ions detected as the $MS^2$ precursor ions and exclude the rest.

3. The ion trap mass spectrometer according to claim 1, further comprising a $MS^3$ measurement processing section configured to measure a $MS^3$ spectrum by dissociation of an ion, which is positioned in the lower mass range with a predetermined mass-to-charge ratio or more as a mass difference from a mass-to-charge ratio of one of the $MS^2$ precursor ions, among product ions obtained by measuring the $MS^2$ spectrum, and subjecting the ion to mass spectrometry.

4. The ion trap mass spectrometer according to claim 1, further comprising a $MS^2$ remeasurement processing section configured to perform a process by the $MS^2$ measurement processing section again for an ion corresponding to a component that cannot be identified when a component that cannot be identified exists in a plurality of ions detected as the $MS^2$ precursor ions.

5. The ion trap mass spectrometer according to claim 1, further comprising: an on-target separation processing section configured to perform a process in which a sample on a target is separated on the target when a component that cannot be identified exists in a plurality of ions detected as the $MS^2$ precursor ions; and a $MS^1$ remeasurement processing section configured to perform a process by the $MS^1$ measurement processing section again for the sample treated by the on-target separation processing section.

6. An ion trap mass spectrometry method in which ions obtained by ionizing a sample are captured in an ion trap, and the ions are dissociated and subjected to mass spectrometry to perform MS' analysis (n is an integer of 2 or greater), the method comprising:

a $MS^1$ measurement step of measuring a $MS^1$ spectrum by performing mass spectrometry of the ionized sample;

a precursor ion detection step of detecting, as $MS^2$ precursor ions, ions corresponding to a plurality of peaks with the intensity or S/N ratio falling within a predetermined range, based on the $MS^1$ spectrum; and a $MS^2$ measurement step of measuring a $MS^2$ spectrum by dissociation of a plurality of ions, which are detected as $MS^2$ precursor ions, in the ion trap and subjecting the ions to mass spectrometry.

7. The ion trap mass spectrometry method according to claim 6, wherein one of peaks adjacent with a predetermined mass-to-charge ratio as a mass difference among a plurality of ions detected as the $MS^2$ precursor ions is left and the rest is excluded in the precursor ion detection step.

8. The ion trap mass spectrometry method according to claim 6, further comprising a $MS^3$ measurement step of measuring a $MS^3$ spectrum by dissociation of an ion, which is positioned in the lower mass range with a predetermined mass-to-charge ratio or more as a mass difference from a mass-to-charge ratio of one of the $MS^2$ precursor ions, among product ions obtained by measuring the $MS^2$ spectrum, and subjecting the ion to mass spectrometry.

9. The ion trap mass spectrometry method according to claim 6, further comprising a $MS^2$ remeasurement step of performing a process by the $MS^2$ measurement step again for an ion corresponding to a component that cannot be identified when a component that cannot be identified exists in a plurality of ions detected as the $MS^2$ precursor ions.

10. The ion trap mass spectrometry method according to claim 6, further comprising: an on-target separation step of performing a process in which a sample on a target is separated on the target when a component that cannot be identified exists in a plurality of ions detected as the $MS^2$ precursor ions; and a $MS^1$ remeasurement step of performing a process of the $MS^1$ measurement step again for the sample treated by the on-target separation step.

* * * * *